United States Patent [19]

Patterson

[11] Patent Number: 5,112,282
[45] Date of Patent: May 12, 1992

[54] HIGH TEMPERATURE POLYURETHANE BELT

[75] Inventor: Philip M. Patterson, Littleton, Colo.

[73] Assignee: The Gates Rubber Company, Denver, Colo.

[21] Appl. No.: 633,510

[22] Filed: Dec. 27, 1990

[51] Int. Cl.⁵ .............................. F16G 5/00
[52] U.S. Cl. .................... 474/260; 474/264
[58] Field of Search ........... 474/260, 264, 266–268, 474/265, 261

[56] References Cited

U.S. PATENT DOCUMENTS

| | | | |
|---|---|---|---|
| 3,256,744 | 6/1966 | Papageorges | 474/264 |
| 3,656,360 | 4/1972 | Fix | 474/250 |
| 3,694,413 | 9/1972 | Batzer et al. | 474/90 |
| 3,830,685 | 8/1974 | Haley et al. | 474/268 |
| 3,871,946 | 3/1975 | Romanski et al. | 474/260 X |
| 4,015,038 | 3/1977 | Romanski et al. | 474/260 X |
| 4,024,773 | 5/1977 | Hartman et al. | 474/265 X |
| 4,244,234 | 1/1981 | Standley | 474/265 X |
| 4,355,069 | 10/1982 | Standley | 474/260 X |
| 4,737,138 | 4/1988 | Komai et al. | 474/266 |

Primary Examiner—Ramon S. Britts
Assistant Examiner—Roger J. Schoeppel
Attorney, Agent, or Firm—J. L. Isaac; C. H. Castleman, Jr.; H. W. Oberg

[57] ABSTRACT

A high and low temperature resistant endless belt is disclosed. The belt includes a main belt body portion prepared from elastomeric material and a tensile member disposed in the body portion. A sheave contact portion is formed integral with the main body portion. The elastomeric material has high and low temperature resistant properties. The elastomeric material is formed from the reaction product of an amine or hydroxy terminated polyol, an hydroxl or amine terminated chain extender, and a polyisocyanate-containing composition adapted for rapid reaction with the extender when admixed therewith in a mold to retain flexibility and resiliency over heat age of the belt.

32 Claims, 5 Drawing Sheets

HIGH TEMPERATURE POLYURETHANE BELT

RELATED APPLICATION

This invention relates to U.S. patent application Ser. No. 633,520, , filed concurrent herewith, and entitled "Reaction Injection Molded Elastomer", which application is assigned to the assignee of the present invention and the contents of which are specifically incorporated herein.

BACKGROUND OF THE INVENTION

1. Field of the Invention

This invention relates generally to endless polyurethane belts and, more particularly, to improved belts resulting from enhanced elastomer composition and formation. Specifically, the present invention relates to an improved endless belt in the form of power transmission belts, V-belts, micro-ribbed belts and the like, having enhanced temperature resistance properties while undergoing dynamic load during operation.

2. Description of the Prior Art

It has been recognized that endless belts, such as power transmission belts, V-belts, micro-V or micro-ribbed belts, and the like, constructed from polyurethane elastomers offer a number of significant advantages over conventional rubber belting. Among these advantages are that an elastomeric belt is less susceptible to flex fatigue, can be driven around smaller sheaves, and demonstrates improved load life. These belts may be vacuum spin cast in a single operation, injection molded, or batch casted as compared to the numerous steps required to build conventional rubber tooth-type belts. However, many of the castable timing belts, and particularly those constructed of urethane, are often noisier than a comparable rubber belt due in part to a difference in the coefficient of friction of the material. Urethane belts have a higher modulus and are generally more aggressive as they enter and leave a sprocket or sheave and build up considerable heat at the interfaces. This heat buildup reduces the efficiency of the belt, and the higher operating temperatures can change the modulus and reduce belt life considerably by lowering the tear strength of the teeth or by attacking the bond between the elastomeric body and the tensile cord embedded therein.

Examples of power transmission belts, V-belts and micro-ribbed belts are disclosed in U.S. Pat. Nos. 3,138,962, 3,200,180, 4,330,287 and 4,332,576. Examples of formation of such belts are readily disclosed in U.S. Pat. No. 3,200,180 as indicated above and U.S. Pat. Nos. 3,772,928 and 4,066,732. These patent references are merely examples of the types of belts and state of the art of formation thereof.

One solution to the noise and heat buildup problem in such belts has been to reduce the coefficient of friction of the sheath engaging surface of the belt by isolating or removing as much of the elastomer as possible from near the surface of the belt which comes in contact with the sprocket teeth or flanges. Such an approach is taken in U.S. Pat. No. 3,772,929. Another way of dealing with the noise and heat degeneration problem is disclosed in U.S. Pat. No. 3,964,328. In this particular patent reference, a layer of elastomer impervious material is utilized during the casting operation and bonded to one side of a wear-resistant fabric.

The references provided above deal primarily with spin cast and injection molded polyurethane-based elastomers. Such polyurethane-based elastomers are often prepared by reacting a relatively high equivalent weight active hydrogen-containing material such as a polyol, and a relatively low equivalent weight active hydrogen-containing material, such as a chain extender, with a polyisocyanate. In preparing the elastomer, the reactive components and any catalyst or other optional additives are generally blended and reacted together and then transferred to a mold of suitable shape where the formulation is cured. In typical injection molding, the mixed material is reacted and heated and then injected into a cold mold to solidify and cure the product. Any tensile members for belt reinforcement are previously placed in the mold. It is typical practice to cure the elastomer in the mold until it is capable of maintaining the molded shape, and then demolding the elastomer and post-curing it until the polymerization is complete. In this manner, the mold may be used more often thereby permitting higher production rates.

Since it is usually desirable to produce as many molded parts, and therefore as many belts, as possible in a given period of time, it is important that the residence time in the mold be as short as possible. Accordingly, it is desirable that the elastomer formulation cure relatively rapidly in the mold to a state which the elastomer can be demolded and postcured. In batch processing, however, it is necessary that the formulation not cure too quickly since some time is required to blend the batch components of the formulation and then transfer the blend to the mold. Once the elastomer sheath has been demolded and postcured, it is then cut into belts.

In addition to batch processing and standard thermoplastic injection molding, Reaction Injection Molding (RIM) is a technique for the rapid mixing, reacting and molding of large, fast curing urethane parts. While RIM polyurethane parts have traditionally been used in a variety of exterior body applications on automobiles where their light weight contributes to energy conservation, RIM polyurethane parts have not typically been used for dynamic application such as in the formation of belts. RIM parts are generally made by rapidly mixing active hydrogen containing materials with polyisocyanate and simultaneously injecting the mixture into a mold where reaction proceeds These active hydrogen containing materials typically include a high molecular weight polyhydric polyether and/or a low molecular weight active hydrogen containing compound, for example, a chain extender Moreover, RIM parts for automobile applications typically are reacted very quickly and demold in 1-2 minutes. After reaction and demolding, the parts may be subjected to an additional curing step by placing them at an ambient temperature or about 250° F. or greater for 4-24 hours. Unfortunately, the extreme rapid reaction time may causes a loss of control over the morphological structure.

Typical RIM elastomers and their preparation include U.S. Pat. Nos. 4,806,615, 4,742,090, 4,404,353, 4,732,919, 4,530,941 and 4,607,090. Typical of accepted RIM practice is to place all components except for the isocyanate in one vessel (B-side) and the isocyanate in another vessel (A-side) prior to reaction, and then admixing these A and B side components together in a mold. U.S. Pat. No. 4,297,444 discloses a modification to this traditional procedure. In this modification, the reacting of a portion of the high molecular weight polyether with a portion of the isocyanate is performed, while the chain extender and remaining polyether are admixed together along with the prepolymer in a RIM process to react the components to form a RIM polyurethane elastomer.

As indicated previously, RIM elastomers have been readily utilized as automobile fascia and other components thereof, such as fenders, steering wheels, dash boards, and various other structural and flexible components. The significant advantage in the RIM processing technique is that admixing, reaction and molding injection all take place simultaneously to reduce the amount of residence time in the mold. Thus, RIM elastomers have found wide acceptance in a variety of consumer and industrial applications.

However, as indicated above, certain product applications necessitating the use of an endless belt require that the belt be subjected to external, dynamic loading as opposed to static and/or non-loaded applications. Moreover, in certain applications such as automobile timing and power transmission belts, V-belts, micro-ribbed belts, and the like, such belts are subjected to both high and low temperature extremes in dynamic loading conditions. In such situations, polyurethane elastomer belts have to date been unacceptable for long term usage due to their tendency to yield and/or crack under dynamic loading at both high and low temperatures. Thus, there remains a need for a polyurethane elastomeric belt that has excellent load carrying capability as well as the characteristics necessary to withstand dynamic loading under high and low temperature conditions, whether such belts are the form of power transmission belts, V-belts, micro-ribbed belts and the like.

SUMMARY OF THE INVENTION

Accordingly, it is one object of the present invention to provide an improved elastomeric belt.

It is another object of the present invention to provide a polyurethane belt having high and low temperature resistance properties when subjected to dynamic loading use.

It is a further object of the present invention to provide a RIM-formed endless belt having a long life with improved performance characteristics for use particularly in high temperature application, that is 275° F. and above, as well as in low temperatures of about −75° F.

To achieve the foregoing and other objects and in accordance with a purpose of the present invention as embodied and broadly described herein, a high and low temperature resistant endless belt is disclosed. The belt includes a main belt body portion prepared from elastomeric material. A tensile structure is disposed within the body portion, and a sheave contact portion is integral with the main body portion. The elastomeric material has high and low temperature resistant properties and is formed from the reaction product of an amine or hydroxy terminated polyol, an hydroxyl or amine terminated chain extender, and a polyisocyanate-containing composition adapted for rapid reaction with the extender when admixed therewith in a mold to retain its softness or flexibility over heat age of the belt. In a preferred form of the invention, the elastomeric main belt body portion and sheave contact portion are formed by the reaction injection molding thereof

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
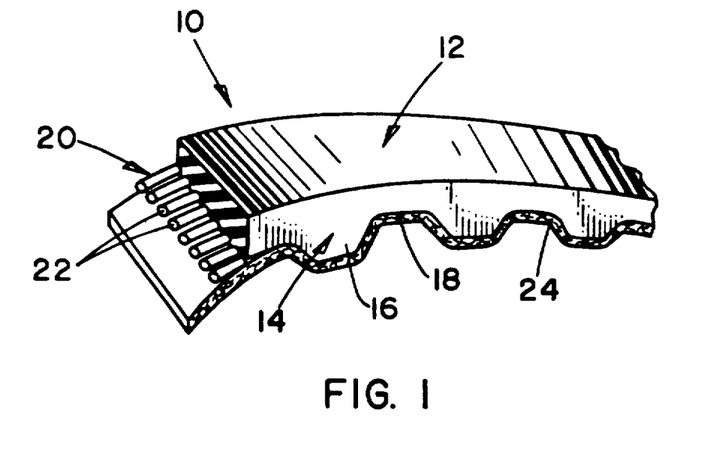
FIG. 1 is a perspective view, with parts in section, of a positive drive power transmission belt constructed in accordance with the present invention.

Referring to FIG. 1, a typical positive drive power transmission belt 10 is illustrated. The belt 10 includes an elastomeric main body portion 12 and a sheave contact portion 14 positioned along the inner-periphery of the main body portion 12. This particular sheave contact portion 14 is in the form of alternating teeth 16 and land portions 18. A tensile layer 20 is positioned within the main body portion 12 for providing support and strength to the belt 10. In the illustrated form, the tensile layer 20 is in the form of a plurality of cords 22 aligned longitudinally along the length of the main body portion 12. It should be understood, however, that any type of tensile layer 20 known to the art may be utilized. Moreover, any desired material may be used as the tensile member such as cotton, rayon, nylon, polyester, aramid, steel and even discontinuous fibers oriented for low carrying capability. In the preferred embodiment of FIG. 1, the tensile layer 20 is in the form of the illustrated cords 22 made from aramid fiber available under the trademark Kevlar. Other preferred cords include fiberglass and carbon filament for power transmission belts as in FIG. 1, and polyester cords for V-belts as in FIG. 2 below.

A reinforcing fabric 24 may be utilized and intimately fits along the alternating teeth 16 and alternating land portions 18 of the belt 10 to form a face cover therefor. This fabric may be of any desired configuration such as a conventional weave consisting of warp and weft threads at any desired angle or may consist of warp threads held together by spaced picket cords of a knitted or braided configuration, and the like. More than one ply of fabric may be employed. If desired, the fabric 24 may be cut on a bias so that the strands form an angle with the direction of travel of the belt. Conventional fabrics may be employed using such materials as cotton, polyester, polyamide, hemp, jute, fiberglass and various other natural and synthetic fibers. In a preferred embodiment of the invention, the fabric layer 24 consists of an expansible wear-resistant fabric in which at least one of the warp or weft threads is made of nylon. In the preferred form, the fabric layer 24 is made from a nylon 66 stretch fabric.

Figure 2:
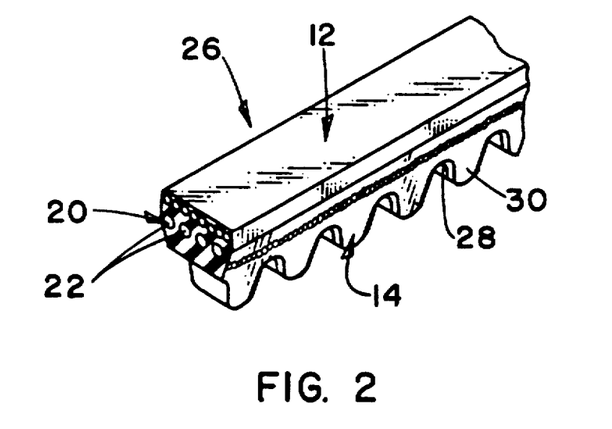
FIG. 2 is a perspective view, with parts in section, of a V-belt constructed in accordance with the present invention.

Referring to FIG. 2, a state of the art or standard V-belt 26 is illustrated therein. The V-belt 26 includes an elastomeric body portion 12 similar to that of FIG. 1 and a tensile reinforcement member 20 in the form of cords 22, also similar to that as illustrated in FIG. 1. The elastomeric body 12 and the cords 22 of the V-belt 26 are constructed from the same materials as described above for FIG. 1.

The V-belt 26 also includes a sheave contact portion 14 as in the power transmission belt of FIG. 1. In this embodiment, however, the sheave contact portion 14 is in the form of alternating notch depression surfaces or troughs 28 and toothed projections 30. These alternating notched depression surfaces 28 and tooth projections 30 preferably follow a generally sinusoidal path as illustrated which serves to distribute and minimize bending stresses as the sheave contact portion 14 passes around pulleys and sheaves.

Figure 3:
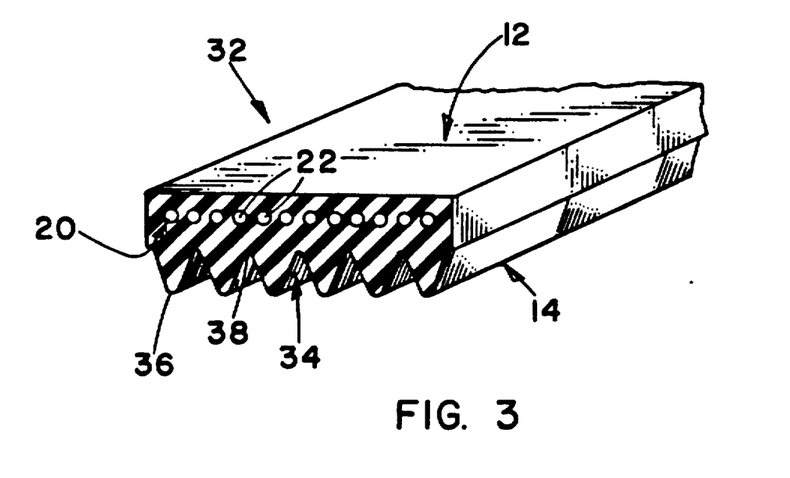
FIG. 3 is a perspective view, with parts in section, of a micro-V or micro-ribbed belt constructed in accordance with the present invention.

Referring to FIG. 3, a micro-V or micro-ribbed belt 32 is illustrated. The micro-V belt 32 includes a main elastomeric body portion 12 as in the belts of FIGS. 1 and 2 and also includes a tensile reinforcement member 20 preferably in the form of cords 22, also as previously described. The sheave contact portion 14 is in the form of a plurality of longitudinally aligned ribs 34 which include a plurality of raised areas or apexes 36 alternating by a plurality of trough areas 38 having oppositely facing sides which define driving surfaces of the belt 32. In each of these instances of FIGS. 1-3, the sheave contact portion 14 is integral with the main body portion 12 and formed from the same elastomeric material to be described in greater detail below. While the present invention is illustrated with reference to the embodiments shown in FIGS. 1-3 and particularly with reference to the positive power transmission belt illustrated in FIG. 1, it should be understood that the present invention is not to be limited to these particular embodiments or forms as illustrated but rather is applicable to any endless belt construction within the scope of the claims as defined below.

Several important factors of belt functionality include both high and low temperature resistance which pertain to heat aging of the belt, elasticity or stretchiness which pertain to flex age and temperature, and brittleness over heat age. There are two important aspects to high temperature dimensional stability of polyurethane belts. The first aspect is droop or sag of the belt when subjected to high temperature, and the second is permanent shrinkage or expansion of the belt's dimension as a result of exposure to either high or low temperatures when in use in a dynamic loading condition. With prior art belts, the predictability of such factors to elevated or lowered temperature extremes under dynamic loading became uncertain. The present invention, however, avoids such droop or sag and maintains modulus under dynamic loading operation when elevated to temperatures of 285° F. and more. In addition, the belts of the present invention are also able to perform quite well under low temperature situations including as low as about $-75°$ F.

The polyols, polyisocyanates and chain extenders useful in the present invention are as described in considerable detail in the previously referenced U.S. patent application Ser. No. 633,520, the contents of which have already been specifically incorporated herein by reference. Thus, a large number of details will not be repeated herein. However, for purposes of necessary explanation, the polyols useful in the present invention include polyether polyols, polyester polyols and the like. A preferred polyol includes an alkylene oxide such as propylene oxide, ethylene oxide or polytetramethylene oxide. The more preferred polyol is polypropylene oxide having a molecular weight range of approximately 5500-6000.

An important factor in the preferred elastomeric embodiment of the present invention involves the use of a polyol with a very low unsaturation level, that is the number of molecules with a single reactive sight. The greater the unsaturation level, the greater the number of monofunctional species in the polyol. Thus, the lower the unsaturation level, the higher the functionality or number of reactive sites per molecule in the polyol. It was discovered during the course of development of the belt of the present invention that power transmission belts constructed from early developed RIM elastomers were cracking unexpectedly at elevated temperatures It was then further discovered that by decreasing the unsaturation level, the premature cracking problem was alleviated. Thus, the preferred polyol unsaturation level is at least as low as 0.06 milliequivalent per gram sample and preferably less then 0.03 meq/g.

The polyisocyanate-containing composition may be composed entirely of a polyisocyanate or it may be a prepolymer mixture of polyisocyanate with a portion or all of the polyol. Use of a true polyisocyanate prepolymer (i.e., about 15 weight percent NCO or less) in the present invention, however, has been found to be very important. Prior art RIM elastomers for nondynamic applications have generally used basic isocyanate elastomers (about 32 weight percent NCO or more) or quasi-prepolymers (about 16-25 weight percent NCO). However, the utility of such elastomers under dynamic load was unsatisfactory as discussed above.

A wide variety of polyisocyanates may be utilized to make the prepolymer in forming the elastomer material of the present invention. The preferred polyisocyanate is an aromatic polyisocyanate having two or more —NCO groups per molecule. While a wide variety of aromatic polyisocyanates may be useful as outlined in the referenced patent application, the preferred polyisocyanate is 4,4'-diphenyl methane diisocyanate (MDI). The preferred prepolymer is the reaction product of the polyisocyanate and the polyol such that there is at least a slight excess of the polyisocyanate. Whatever the aromatic polyisocyanate selected for use in the present invention, it is imperative that it be capable of rapid reaction time when admixed with a selected chain extender. In this manner, the combinations may be used in a RIM process wherein reaction time is approximately five seconds as opposed to a cast system which has a pot life of at least about five minutes.

Regardless of the specific selected polyisocyanate, the prepolymer preferably includes an isocyanate composition of approximately 3-25 weight percent —NCO, and more preferably approximately 7-12 weight percent —NCO. In addition, a preferred stoichiometric mixing ratio of polyisocyanate to polyol expressed as a reactive ratio of NCO/OH, is approximately 0.90-1.20 and more preferably approximately 1.01-1.03.

The chain extenders useful in the present invention are selected so as to be capable of rapid reaction time with the prepolymer. The chain extender may include a compound of aliphatic hydroxy compounds or may be an amine terminated compound, either aliphatic or aromatic. In one high temperature resistant embodiment of the invention, the chain extender may be either hydroxy or amine terminated. In another preferred embodiment of the invention, particularly wherein the belt of the invention is a result of reactive injection molding (RIM) processing as described in detail below, the preferred chain extender is an aromatic amine. In this more preferred form, the aromatic amine chain extender is 4,4'-methylenebis(orthochloroaniline), better known as MOCA or MBOCA.

In the preferred embodiment of the invention wherein the belt is formed through reactive injection molding, the chain extender preferably is the aromatic amine MOCA present in the amount of approximately 20-100 weight percent relative to the combined amount of chain extender and polyol. More preferably, this composition is selected so that MOCA is present in approximately 35-40 weight percent relative to the combined amount of the chain extender and polyol. In an alternate RIM reaction product embodiment, the isocyanate reacted polyol forms the A-side component of the RIM process so that the B-side component consists of 100% chain extender, preferably MOCA, relative to any polyol. In this manner, one can better control the rate of hard segment formation and subsequent phase separation in the elastomer, because the isocyanate in this instance is not involved in two competing reactions during the RIM injection as described below.

A more preferred form of the present invention is an elastomeric belt having an elastomeric composition wherein the polyol is 5500-6000 molecular weight polypropylene oxide, ethylene oxide capped, the chain extender is MOCA present in approximately 35-40 weight percent relative to the combination of MOCA and polyol, and the prepolymer comprises the reacted polyol with MDI resulting in 8-9% NCO.

Other added compounds may be useful as part of the elastomer composition in the belt of the present invention. These compounds include catalysts to decrease the reaction time of the components. The catalysts may be selected from any desirable compound known in the art and is preferably selected from organo-metal compounds, tertiary amines, and alkali metal alkoxides. However, the polyureaurethanes can be prepared with or without catalysts. Those polyols which do not contain amine terminated groups are most typically prepared with a catalyst as described above. Suitable organo-metal compounds useful as catalysts include but are not necessarily limited to aliphatic soaps of tin, mercury, iron, zinc, bismuth, antimony, cobalt, maganese, vanadium, copper and the like. Examples include organic ligands which are carboxylic acids of 2-20 carbons, such as dibutyl tin dilaurate, dimethyl tin dilaurate, phenylmercuric propionate, copper naphthenate and the like. A particularly preferred catalyst with the composition of the present invention is bismuth neodecanoate. The metallic catalysts are believed to also help in retaining flexibility and resiliency of the belt of the present invention over heat age and flexing time. In this manner, the belt of the invention tends to retain its softness with heat age rather than become hard as in prior art rubber belts, and the metallic catalysts are believed to contribute to this property.

The present invention may also utilize various other additives in order to assist in the processing or functioning of a belt constructed in accordance with the present invention. For example, antioxidants are particularly useful when the elastomeric belt of the present invention is in the form of a power transmission belt. Suitable antioxidants include 2,6-di-t-butylphenol and polyalkylene glycol esters of hindered phenols of substituted alkanoic acids. Examples include 3-methyl-5-t-butyl-4-hydroxybenzoic acid ester of ethylene glycol, and bis{3-(3-methyl-5-t-butyl-4-hydroxyphenyl) propionate} of trimethylene glycol. The last example is a preferred product commercially available from Ciba-Geigy under the trade name Irganox 245.

Another additive to the belt elastomer composition preferably includes a slip agent preferably in the form of a silicon lubricant, and in particular a polysiloxane. In the preferred form, the polysiloxane is a 2,000 molecular weight although an acceptable molecular weight range would be in the neighborhood of about 1,000-10,000. The polysiloxane is useful in the present invention to reduce noise as the belt moves through sheaves. The advantage of the polysiloxane was found that it does not affect the urethane molecular structure of the belt elastomer in that it preferentially occupies the void free volume in the soft segment of the urethane rather than interfering with the hard segment. Consequently, it does have the unique ability to readily move through the elastomeric composition to the elastomer surface.

At the surface of the belt, which is the interface of the sheave contact portion 14 and a sheave, the polysiloxane assists in decreasing the noise caused by movement of the belt through the sheave. If the molecular weight of the polysiloxane is too low, the molecules of the polysiloxane tend to diffuse out of the belt too quickly. This prematurely eliminates the anti-noise capability of the belt during its lifetime. On the other hand, if the molecular weight range is too high, the polysiloxane molecules are too large to readily migrate through the elastomer to its surface. Once the initial polysiloxane layer at the surface is depleted, then, the noise abatement capability of the polysiloxane throughout the remainder of the belt is reduced because of slow diffusion to the belt surface.

In preparing the elastomer belt of the present invention, any known molding process may be utilized including casting, injection molding and reaction injection molding. In the preferred form, RIM is utilized, and the elastomer belt of the invention is the RIM reaction product as now discussed in detail below. In this preferred RIM embodiment, two fluid input streams are formed. The A-side component stream includes the polyisocyanate-containing prepolymer, while the B-side component includes the chain extender, excess polyol, if any, and other miscellaneous additives such as catalyst, slip agents, antioxidants, colors and the like. The A-side may include just the polyisocyanate selected as discussed above, or it may include a prereacted polyisocyanate prepolymer with a percentage of the polyol up to and including 100% of the polyol utilized in the elastomeric composition with or without an excess of —NCO. The B-side component, as described above, includes the remaining excess polyol unless 100% of the polyol is admixed in the A-side prepolymer. As indicated, the A-side isocyanate-containing prepolymer is prereacted at appropriate temperatures to form the A-side fluid stream component.

Figure 4:
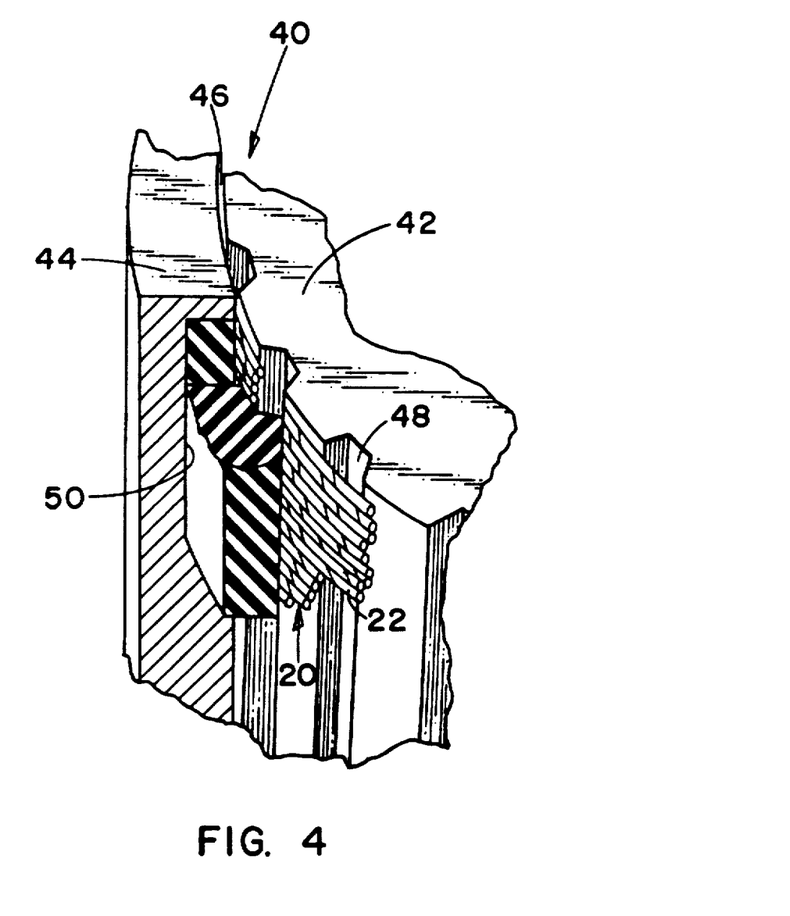
FIG. 4 is a perspective view, with parts in section, of a mold designed to produce the belt illustrated in FIG. 1.

Referring now to FIG. 4, a typical mold 40 is illustrated for purposes of explaining the reaction injection process of forming the belt of the present invention. Mold 40 consists of an inner mandrel 42 and an outer shell 44 having a spaced area 46 therebetween. Notches 48 are formed in the inner mandrel 42, and a recessed portion 50 is formed in the outer shell 44. The tensile layer 20 in the form of Kevlar cords 22 are wound around the outer surface of the inner mandrel 42. Once the cords 22 are placed in position, the outer shell 44 is positioned about the inner mandrel 42 and readied for belt formation.

Once the A-side and B-side constituent streams are formed as described above, they are injected through a RIM mixhead (not illustrated) into the mold 40 into the space 46 between the inner mandrel 42 and the outer shell 44. The mixhead is designed to mix A and B-side components together and simultaneously inject them into the mold 40 thereby reacting the A and B-side components during injection typical of RIM processes. The A and B mixed composition is injected into the mold 40 to produce the desired shape of belt, in this instance a power transmission belt as illustrated in FIG. 1. As can be seen from FIG. 4, the injected elastomer fills the recessed area 50 to form the main body portion 12, the notches 48 to form the teeth 16, and the interstices between the cords 22. The injected mixed composition is then allowed to gel and solidify in the mold 40 at which time it is demolded and permitted to post-cure separate from the mold.

The processing temperatures of both the A and B side will generally range from 40°-120° C. and preferably 65°-75° C. The gel time of the material in the mold will vary depending on the constituent components thereof. The gel time will generally be between 0-15 minutes. More particularly, when a catalyst is not utilized, a hard gel will generally take place in about 1½-2 minutes or, if activated amines are used, in about 15 seconds. When a catalyst is utilized, a soft gel is initially obtained followed by vitrification in approximately ½-2½ minutes. The demold time will generally range from 1-60 minutes with a postcure time of from 0-24 hours at about 200°-450° F. These ranges, of course, will depend upon the actual selection of the polyisocyanate, chain extender and polyol combinations. It should be noted that the A and B side component reactants are injected typically at rates of approximately 100-800 grams per second into the mold.

The resultant elastomeric portion of the belt of the present invention is a combination of hard and soft segments created by the reacted constituents as described above. Important aspects of the present invention are that the hard segment average length is fairly uniform and that the hard segments are closely packed with each other. Therefore, the elastomeric composition of the present invention has better flex fatigue characteristics and tends to be more resistant to cracking than prior art materials. Moreover, the ethylene oxide groups on the ends of the polyol assist in phase segregation of the hard and soft segments. As a result, the elastomeric belt of the present invention retains flexibility and resiliency over heat age during use rather than hardening as in prior art rubber compositions, which tend to thermoset or crystallize depending on the nature of the composition. This feature is also enhanced in part due to use of metallic catalysts as discussed previously above.

A significant advantage of the present invention is in combined high and low temperature applications and thus provides the elastomeric belt of the present invention with high and low temperature resistance. The present invention is particularly useful in dynamic applications when loads are applied in high temperature environments, which applications would tend to cause either cracking or melting of prior art compositions. Examples of environments subjected to such conditions and for which the present invention is highly useful include power transmission synchronous timing belts for automobile engines. The present invention also has excellent load carrying capability with a long heat age and flex life.

The present invention also has good low temperature resistance as well. This is believed to be due to the low glass transition temperature of the propylene oxide polyols as well as improved phase segregation in the belt elastomer.

A variety of tests have been performed comparing the various performance characteristics and properties of the belt of the present invention with belts of prior construction using state of the art technology. In general, the belt of the present invention tends to get softer with heat aging rather than harder as compared to rubber belts, which increase in crosslink density resulting in higher modulus with heat age.

Several characteristics have been reviewed and compared including elasticity, tension loss, creep, compression set, temperature resistance, flex fatigue, hysteresis, oil and water resistance, and heat aging. For purposes of the test results discussed below, the following belt terminology is defined. The X belt is in fact a preferred embodiment of the present invention and includes a power transmission belt having Kevlar cords as tensile members. It was made by reaction injection molding of A and B components to provide an elastomer composition having 8% NCO content from the isocyanate MDI, and a 60/40 weight percent ratio of a polypropylene polyol to a MOCA chain extender. The Y belt is also an embodiment of the present invention in the form of a power transmission belt and includes a Kevlar cord structure with an elastomer formed by the RIM injection molding of an A-side component having a prepolymer consisting of polypropylene oxide admixed with MDI to result in an 8 weight percent NCO content, and a B component consisting of the chain extender 1,4-butylene glycol.

The prior art power transmission belts against which the X and Y belts as described above were tested included a belt designated I. This was an Adiprene-based elastomeric composition, Adiprene being a trademark of the E.I. Du Pont de Nemours Company for a polyurethane elastomer which is a reaction product of diisocyanante and polyalkylene ether glycol. Another prior art belt utilized included neoprene, which is a polychloroprene rubber, as the elastomer. This belt was designated as II. Yet another state of the art belt is one that carries the designation III, which is a hydrogenated nitrile rubber elastomeric material common to the rubber belt and hose industry.

EXAMPLE I

Compression set tests were performed on the elastomer material for the X belt and compared to that of the III belt. The data from this test is summarized in Table I and shows the results of these compression tests at both 10% and 25% compression levels. From the table, it is clear that temperature dependence of the compression set in values is relatively linear between temperature and compression set for the III belt. On the other hand, the X belt polyurethane has a better or lower set value than the III belt at lower temperatures, but at higher temperatures the X polyurethane takes a complete compression set. Based on this information alone, one would not normally conclude that the X belt composition would be a particularly good composition for use in a belt in high temperature environments. However, the surprising result is that the belt performs exceptionally well in high temperature environments under dynamic loading as discussed above and as clearly indicated by the additional test results provided below.

TABLE I

|  | X | | III | |
|---|---|---|---|---|
|  | 10% | 25% | 10% | 25% |
| 70 hrs @ 158° F. | 20% | 19% | 26% | 23% |
| 70 hrs @ 185° F. | 30% | 29% | 40% | 35% |
| 70 hrs @ 212° F. | 64% | 56% | 53% | 47% |
| 70 hrs @ 250° F. | 127% | 107% | 68% | 63% |
| 70 hrs @ 250° F. |  | 111% |  | 68% |
| 70 hrs @ 275° F. |  | 111% |  | 72% |

EXAMPLE II

In this particular test program, the X belt of the present invention was tested against several reference belts, including the II neoprene belt, the III belt, both soft and hard, and another belt designated as IV which is a chlorosulfonated polyethylene synthetic rubber available under the trademark Hypalon from the E.I. Du Pont de Nemours Company. In all of these tests of this Example II, the belts were constructed as 97 tooth belts, one inch wide, and were tested by being placed on a dead weight pulley applying 150 lbs. dead weight. The belts were then heated to about 257° F. and observed for the appearance of the first small crack as well as cracks across the back rubber and fabric cracks. In these tests, the neoprene II belt was the first to fail in the sense of having cracks appear, and it lasted only slightly longer than 100 hours at temperature. The III belts lasted from 2.2 to four times as long as the neoprene II control belt. The IV belt with the Hypalon elastomer provided, on the average, about three times the heat resistance of the II control belt by lasting about three times as long. Finally, the X belt had a significantly better heat resistance than any of the other elastomer constructions illustrated in this Example II. The X belts tested lasted on the average of over 690 hours, or about 6.6 times the II control belt. Another observation of this particular test was that the brittleness of all the rubber belts increased with heat age time except for the X belt, which retained its flexibility or resiliency and in fact even softened slightly with time. This feature is discussed in more detail above and was in fact observed during this testing operation.

EXAMPLE III

A series of property characteristic tests were run on the X, II, III and IV belts. In the load capacity or carrying tests, it was determined that the X elastomeric compound had three times the static modulus of any of the other elastomeric materials tested and four times the dynamic modulus. The II compound was definitely the softest material, while the X belt clearly had the highest load carrying capability. As in the previous Example 1, all the belt compounds tested showed a high compression set, and the X belt compound had a total set above 257° F. The modulus properties of the III compound showed the least temperature sensitivity while the X compound was also surprisingly good.

In addition, the X urethane composition had the tested, while the II belt provided the worst resistance. However, the X belt hysteresis was lower than the rubber belts at high temperatures of 275°-300° F. Finally, X belt tensile strength was about the same as the rubber belts at room temperature but was considerably better with heat age.

The X belt urethane composition had a very good oil resistance and a superior water resistance. The III belt had the best oil resistance while the IV belt had the worst oil resistance. Moreover, the III belt composition had very good water resistance while the IV belt material had very poor water resistance.

Low temperature properties were also tested. In this instance, cold crank tests indicated that the X belt composition had outstanding low temperature properties, and in particular showed a low temperature resistance of lower than −60° F. The rubber belts tested at a low temperature resistance of about −30° to −35° F. Moreover, low temperature properties after heat aging were good for all the compounds, but were best for the X belt.

In addition, flex fatigue was tested. The high compound modulus of the X belt urethane composition provided the II and III belt material showed moderate flex fatigue resistance. The IV belt provided the best flex fatigue resistance in this particular test program.

Belt material testing indicated that the X belt had a lower fabric peak adhesion than the III belt while the land adhesion was comparable to the III belt. However, cord adhesion was much higher for the X belt than the rubber III belt, although cord adhesion was reduced by exposure to oil and water. In addition, the tooth shear for the X belt was almost half that of the rubber III belt.

Finally, the heat aging tests of this particular example showed that the neoprene II belt had a very limited life at 250° F. Specifically, it had a maximum lifetime of 14 days at which point it failed. At the opposite end of this result, the X belt composition provided excellent property retention at 275° F., and was far better than any of the other compositions tested in this Example III.

EXAMPLE IV

Figure 5:
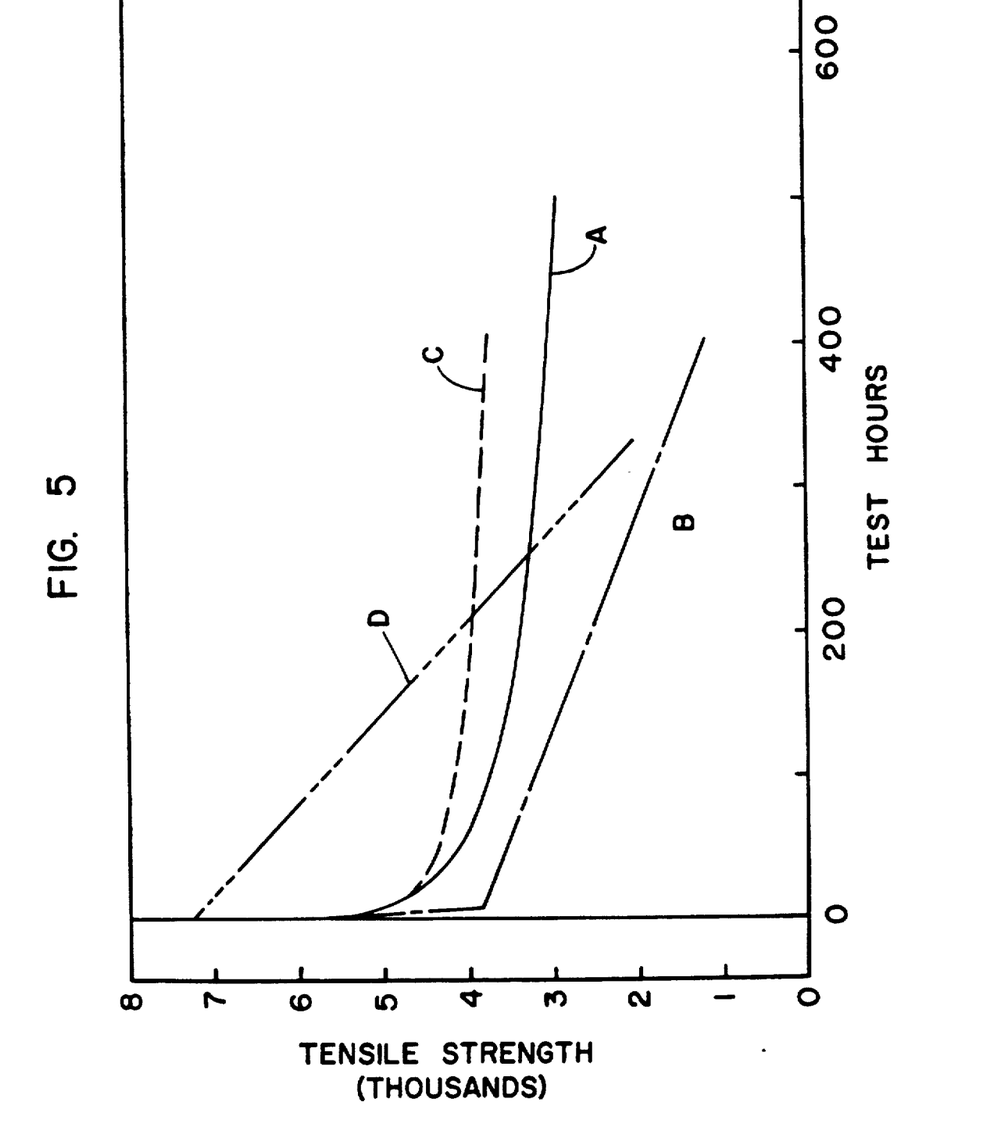
FIG. 5 is a graph illustrating the relationship between tensile strength and time thereby showing flex fatigue characteristics of several belts embodiments of the invention and one prior art belt construction.

In this testing program, a variety of belt compositions with different tensile member materials were constructed in accordance with the present invention and tested against each other and against a rubber belt. This particular test was performed to determine tensile strength over time, or tensile member flex fatigue. In this particular example, and with reference to Table II and FIG. 5, A is the X belt with a Kevlar cord tensile member, B is the Y belt with a 1425 ply cord, C is a modification of the X belt utilizing a lighter weight Kevlar cord and an 80/20 ratio of polyol to chain extender, and D is the III belt with a fiberglass cord. This particular tensile strength test was run at 257° F., and each of the test belts was pulled apart longitudinally after running the indicated time period (see Table II) to determine the tensile strength of that belt at that particular point in time. As can be seen from Table II and FIG. 5, the tensile strength of the rubber III prior art belt decreases rapidly and continuously over time at the elevated temperature. The Y belt tensile strength decreases with time, but at a substantially less rapid rate than the III belt. Both the X belt and the 80/20 modified X belt, A and C respectively, initially decrease in tensile strength and then level out at a fairly consistent tensile strength over at least 500 hours of the test. Thus, it can be seen that the belt construction of the present invention including the selected tensile member will maintain a relatively consistent tensile strength over time while being operated under dynamic load conditions at elevated temperatures.

TABLE II

| Test Life Hours | Tensile Strength | | | |
|---|---|---|---|---|
| | B | D | A | C |
| 0 | 6733 | 7000 | 7217 | 6238 |
| 0 | 6666 | | 7588 | |
| 0.5 | 4600 | | | |
| 1 | 4700 | | | |
| 3 | 4266 | | | |
| 8 | 3733 | | | |
| 8 | 3333 | | | |
| 17 | | 7000 | | |
| 24 | 3866 | | | |
| 24 | 3466 | | | |
| 50 | 3133 | | 3857 | 4100 |
| 50 | | | 4190 | 4767 |
| 50 | | | | 4667 |
| 50 | | | | 3867 |
| 50 | | | | 4667 |
| 50 | | | | 4600 |
| 57 | 3000 | | | |
| 68 | 3466 | | | |
| 93 | | 6533 | | |
| 97 | | | 3724 | |
| 97 | | | 4123 | |
| 98 | | | | 3533 |
| 100 | | | | 3867 |
| 128 | | 6267 | | |
| 191 | 2000 | | | |
| 199 | | | | 4000 |
| 199 | | | | 4400 |
| 208 | | | 3392 | |
| 214 | | | 3125 | |
| 217 | | 3867 | | |
| 223 | | 2547 | | |
| 225 | 2533 | | | |
| 228 | 1666 | | | |
| 234 | | 2333 | | |
| 238 | | 4440 | | |
| 256 | | 3253 | | |
| 259 | 2533 | | | |
| 297 | 1600 | | | |
| 327 | 2000 | | | |
| 329 | | 2373 | | |
| 333 | | 3067 | | |
| 391 | 1800 | | | |
| 399 | | | | 3533 |
| 410 | | | | 3967 |
| 499 | | | 3192 | |
| 499 | | | 2760 | |

EXAMPLE IV

In this particular test, belts were tested to failure at various different temperatures. The belts tested were the X belt, the Y belt, and the I belt. All three of these belts were subjected to a loaded horsepower test, wherein each belt was placed on two sprockets, each of the sprockets being 19 tooth, with a two inch back side idler. The belts that were tested were ⅜ inches in width and were operated at 3200 rpm during all temperatures. 94 inch lbs. of torque or tension were applied during the test, and the test had generated approximately five horse power to simulate the horse power requirement of an overhead camshaft drive in an automobile engine.

These three belts were tested to failure at room temperature, 240° F. and 275° F. At the room temperature test, none of the belts failed after over 6,000 hours of operation. This is also the case at the medium temperature 240° F. test. However, at the high temperature, or 275°, the X belts continued operation at over 5700 hours, while both the I and Y belts failed. More specifically, at 275° F., it was discovered that the I belt ran approximately twice as long to failure as compared to the Y belt. However, the X belt ran more than six times as long as the Y belt and more than three times as long as the I belt, and was still in operation at the time of preparing and filing of this application. Thus, it is clear that the belt constructed in accordance with the present invention has high lifetime properties over a wide variety of temperature ranges from room temperature all the way to high temperature environments.

EXAMPLE VI

Figure 6:
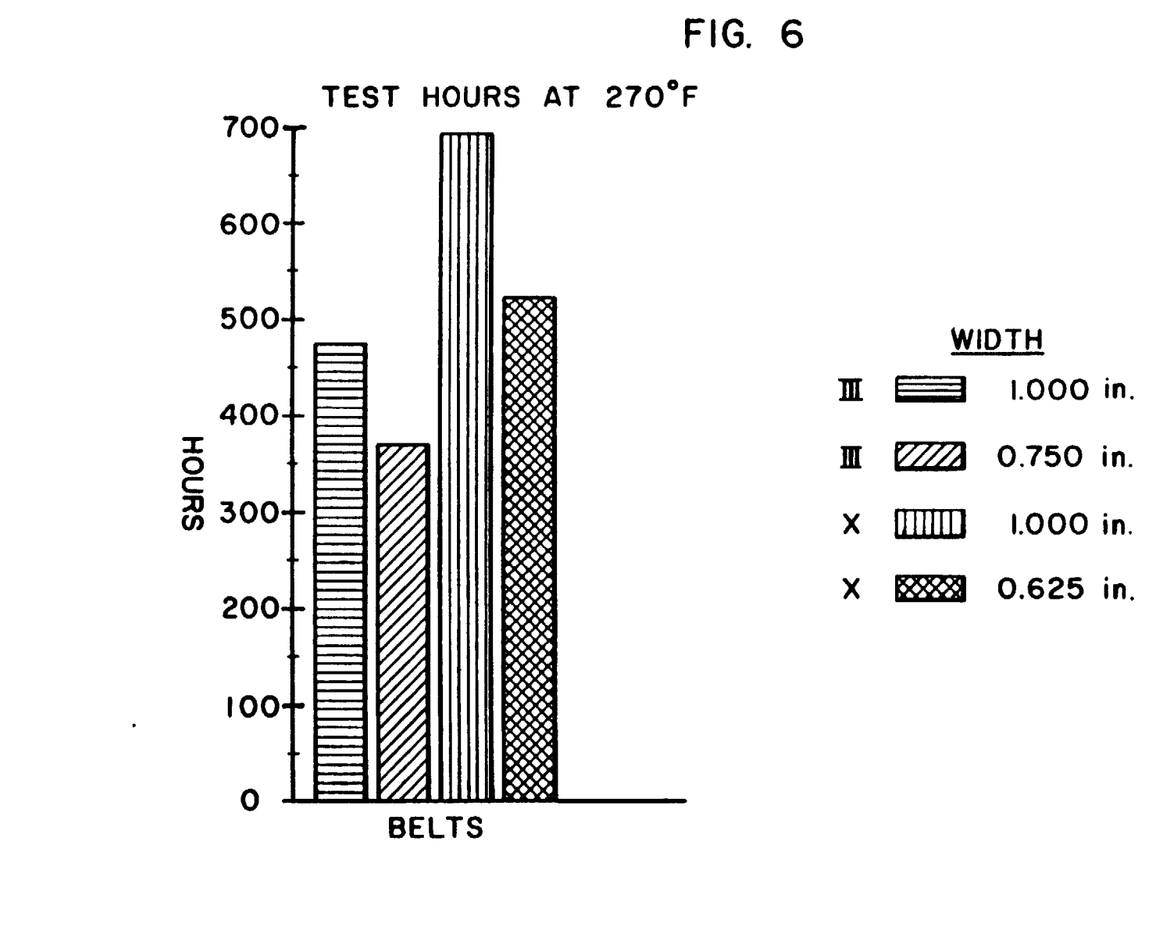
FIG. 6 is a bar graph illustrating the time to failure of two belt embodiments of the invention and two prior art belt constructions at 270° F.

FIG. 6 illustrates another set of tests comparing the X belt at two different widths to the III rubber belt, also at two different widths. These four belts were run at 270° F. until failure. Both X belts lasted longer than either rubber III belts. In fact, even the ⅜" X belt lasted over rubber III belts. In fact, even the ⅜" X belt lasted over 10% longer than a 1" width rubber belt. Clearly, the X belt of the present invention has a substantially longer life in high temperature environments than counterpart rubber belts.

EXAMPLE VII

Figure 7:
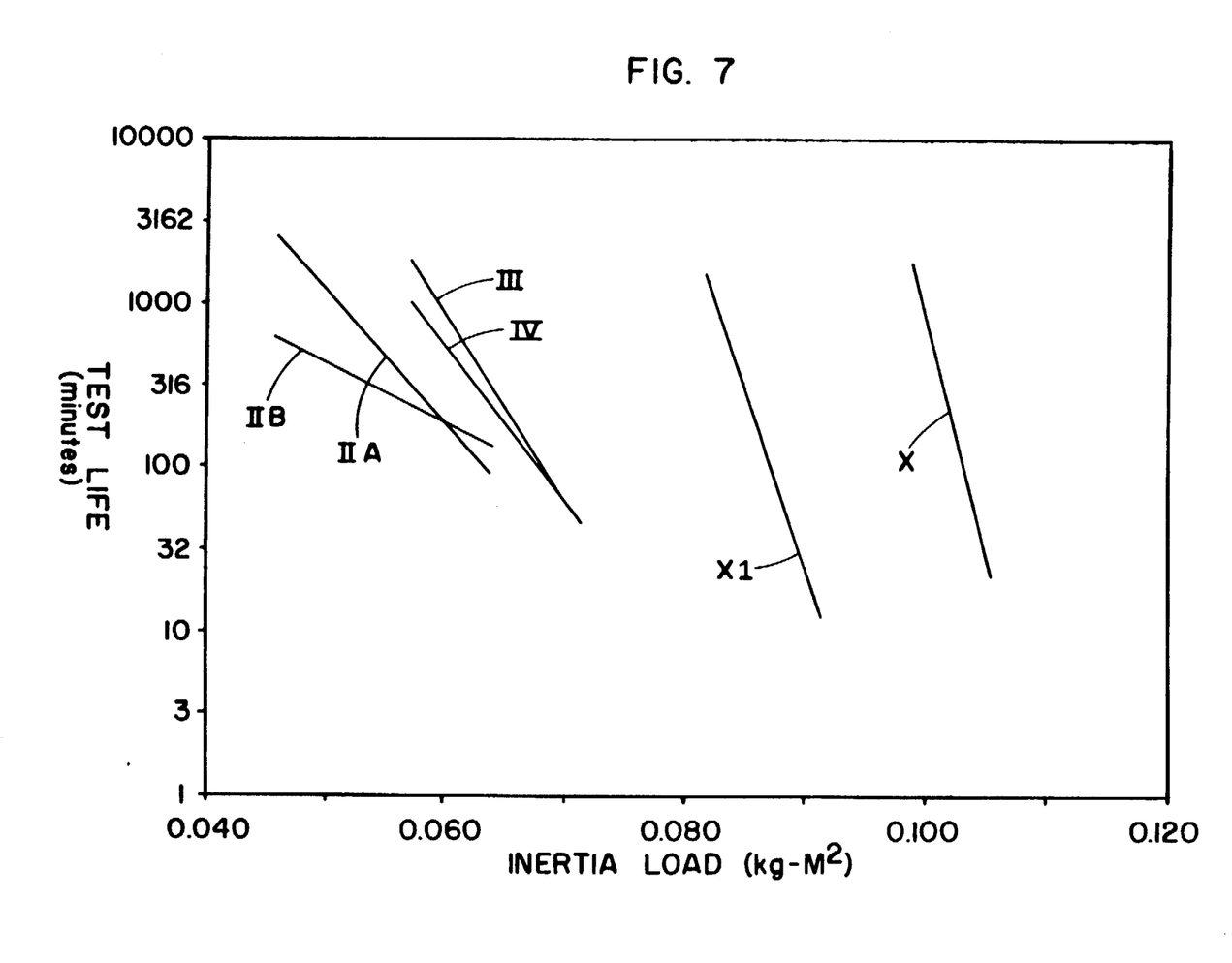
FIG. 7 is a graph illustrating the results of inertia load over test life for several prior art belts and two embodiments of the present invention.

In this example, the inertia load capability of several belts were tested and compared over time. In this test, the results of which are illustrated in FIG. 7, the X belt and an 80/20 soft version of the X belt (designated X1) were tested and compared to two different II belts (IIA and IIB), a III belt, and a IV belt. In each instance, the tested belt was in the form of a 97 tooth belt, ⅜ in. wide with similar tooth profile. Each belt was oscillated through about 1 radian on a pulley with an installation tension of 266.9 newtons. As the results from FIG. 7 show, both the X and X1 belts had substantially greater inertia load capability as compared to the IIA, IIB, III and IV belts over the same test life.

As can be see from the above, the present invention provides an improved elastomeric belt construction. This elastomeric belt is preferably manufactured utilizing reaction injection molding technologies so as to provide for short mold times and rapid cure rates thereby substantially increasing the production capacity. However, casting and injection molding techniques and spin casting may also be utilized. Moreover, the elastomeric belt of the present invention has particularly enhanced characteristics so as to retain its shape and strength under continuous dynamic loading conditions as well as resisting degradation and stretching under both high and low temperature conditions. Moreover, because of the nature of this belt composition, the belt of the present invention can be reaction injection molded at high pressure and material velocity without moving cord and fabric within the mold thus providing high production economies of the RIM process while simultaneously exhibiting the desirable characteristics as described above. As a result, the belt construction of the present invention is useful in a wide variety of belt applications including use in synchronous timing and power transmission belts for automobile engines subjected to unusually high temperatures of today's automobiles as well as V-belts, micro-V belts, flat industrial belts and other belt applications.

The foregoing description and the illustrative embodiments of the present invention have been described in detail in varying modifications and alternate embodiments. It should be understood, however, that the foregoing description of the invention is exemplary only, and that the scope of the invention is limited only to the claims as interpreted in view of the prior art.

What is claimed is:

1. A high and low temperature resistant endless belt comprising a main belt body portion prepared from elastomeric material, tensile means disposed in said body portion, and a sheave contact portion integral with said main body portion, said elastomeric material having high and low temperature resistant properties and formed from the reaction product of polyolpropylene oxide polyol having a molecular weight of up to 10,000, an hydroxyl or amine terminated chain extender, and a polyisocyanate-containing composition adapted for rapid reaction with said extender when admixed therewith in a mold to retain flexibility and resiliency over heat age of said belt.

2. The belt as claimed in claim 1, wherein said sheave contact portion is prepared from said elastomeric material.

3. The belt as claimed in claim 2, wherein said sheave contact portion includes a layer of wear-resistant fabric positioned substantially along the periphery of said sheave contact portion.

4. The belt as claimed in claim 2, wherein said sheave contact portion further includes a plurality of spaced teeth integral with and disposed along the inner periphery of said sheave contact portion to form alternating teeth and land portions.

5. The belt as claimed in claim 4, wherein said sheave contact portion further includes a layer of wear-resistant fabric positioned substantially over the peripheral surfaces of said teeth and land portions.

6. The belt as claimed in claim 1, wherein said tensile means comprises a tensile layer aligned longitudinally within said main belt body portion and forming a bond therewith.

7. The belt as claimed in claim 6, wherein said tensile layer comprises a plurality of wound cords.

8. The belt as claimed in claim 7, wherein said wound cords comprise a polyaramid.

9. The belt as claimed in claim 1, wherein said elastomeric material is the product of reaction injection molding of said polyol, an hydroxyl or amine terminated chain extender, and said polyisocyanate-containing prepolymer to provide a high temperature resistance of 275° F and greater.

10. The belt as claimed in claim 9, wherein said polyol, said chain extender and said prepolymer are injected at high pressure and velocity for reaction without affecting the positioning of said tensile means within in said mold.

11. The belt as claimed in claim 9, wherein said elastomeric material has a hard segment and a soft segment that is formed by an A-side component comprising said polyisocyanate-containing prepolymer and a B-side component comprising said polyol and said chain extender.

12. The belt as claimed in claim 11, wherein said chain extender comprises 20-100 weight percent of said B-side component.

13. The belt as claimed in claim 12, wherein said chain extender comprises approximately 35-40 weight percent of B-side component.

14. The belt as claimed in claim 12, wherein said chain extender comprises said B-side component and wherein all said polyol is disposed in said A-side component prepolymer.

15. The belt as claimed in claim 1, wherein said chain extender comprises an aromatic amine.

16. The belt as claimed in claim 15, wherein said chain extender comprises MOCA.

17. The belt as claimed in claim 1, wherein said elastomeric material has an NCO/OH ratio approximately 0.09-1.20.

18. The belt as claimed in claim 1, wherein said polyisocyanate comprises diphenylmethane diisocyanate or derivatives thereof.

19. The belt as claimed in claim 18, wherein said polyisocyanate comprises MDI.

20. The belt as claimed in claim 9, wherein said elastomeric material and said tensile means provide said belt with a high temperature resistance of up to 300° F. while in continuous use under dynamic load and a low temperature resistance of −72° F. while in use under dynamic load.

21. The belt as claimed in claim 1, wherein said elastomeric material further comprises means to control the coefficient of friction of said belt while in operation.

22. The belt as claimed in claim 21 wherein said control means comprises a slip agent in the form of a lubricant.

23. The belt as claimed in claim 22, wherein said control means comprises a polysiloxane.

24. A reaction injection molded endless belt comprising a main belt body portion prepared from elastomeric material, tensile means disposed in said body portion, and a sheave contact portion, said elastomeric material comprising a segmented polyurea-urethane elastomer having hard and soft segments and having high and low temperature resistant properties and comprising the reaction injection molded product of an amine or hydroxy terminated polyol, an amine terminated chain extender, and a polyisocyanate-containing prepolymer adapted for rapid reaction with said extender when injected together into a mold.

25. An endless belt comprising a main belt body portion prepared from a molded elastomer, tensile means disposed in said body portion to enhance load strength of said belt, and a sheave contact portion, said molded elastomer comprising a reaction product of a polyisocyanate-containing prepolymer, an amine terminated polyol having an unsaturated level of less than about 0.06 milliequivalents per gram polyol, and an hydroxl or amine terminated chain extender capable of rapid reaction rates with said prepolymer when admixed therewith in a mold.

26. The belt as claimed in claim 25 wherein said polyol unsaturated level is less than about 0.03 milliequivalents per gram polyol.

27. An endless positive drive power transmission belt comprising an elastomeric body portion, tensile means embedded in said boy portion, and a plurality of spaced teeth integral with and disposed along the inner periphery of said body portion to form alternating teeth and land portions, said elastomeric body portion and teeth being formed from a molded elastomer having high and low temperature resistance in dynamic loading applications, which elastomer is a reaction product of polypropylene polyol, a chain extender comprising MOCA present in approximately 35-40 weight percent relative to the combination of MOCA and polyol, and a polyisocyanate-containing prepolymer comprising MDI capable of rapid reaction time with said extender when admixed together in a mold.

28. The belt as claimed in claim 27, wherein said belt further includes a layer of wear-resistant fabric positioned substantially over the peripheral surface of said teeth and land portions, and wherein said molded elastomer is the reaction injection molded product of said polyol, an amine terminated chain extender, and said prepolymer which are adapted to rapidly react when injected into a mold without disturbing the positioning of said tensile means and said fabric.

29. The belt as claimed in claim 27 wherein said polyol has an unsaturated level of less than about 0.06 milliequivalents per gram polyol.

30. The belt as claimed in claim 27 wherein said molded elastomer is formed from the reaction injection molding of an A-side component comprising said prepolymer and a substantial portion of said polyol, and a B-side component comprising said chain extender and the residual portion of said polyol.

31. The belt as claimed in claim 30, wherein said A-side component comprises said prepolymer with all of said polyol, and said B-side component comprises said chain extender without polyol.

32. A molded endless belt comprising a main body portion prepared from elastomeric material, tensile means disposed in said body portion, and a sheave contact portion integral with said main body portion, said elastomeric material having temperature resistant properties and comprising the reaction product of an amine or hydroxy terminated polyol, an hydroxl or amine terminated chain extender, and a polyisocyanate-containing prepolymer adapted for rapid reaction with said extender when injected together into a mold, said reaction product also including a slip agent comprising polysiloxane in the form of a lubricant for controlling the coefficient of friction of said belt to reduce the noise generated during operation of said belt.

* * * * *

UNITED STATES PATENT AND TRADEMARK OFFICE
CERTIFICATE OF CORRECTION

PATENT NO. : 5,112,282
DATED : May 12, 1992
INVENTOR(S) : Philip M. Patterson

It is certified that error appears in the above-indentified patent and that said Letters Patent is hereby corrected as shown below:

On the title page, inventors should read item:

[75] Inventors: Philip M. Patterson of Littleton, Colorado; and
Vicki C. Copeland of Lakewood, Colorado.

In Claim 1, Col. 15, lines 10-11, delete "polyolpropylene" and substitute therefor--polypropylene--.

In Claim 20, Col. 16, line 17, after "resistance of" insert-- $-75°$ F--and delete $-72°$ F.

Signed and Sealed this

Sixteenth Day of May, 1995

Attest:

BRUCE LEHMAN

*Attesting Officer*    *Commissioner of Patents and Trademarks*